United States Patent [19]

Blackwell

[11] Patent Number: 4,637,625
[45] Date of Patent: Jan. 20, 1987

[54] MOWER HITCH ASSEMBLY

[76] Inventor: John B. Blackwell, 1507 Woodland Dr., Centerville, Tenn. 37033

[21] Appl. No.: 746,745

[22] Filed: Jun. 20, 1985

[51] Int. Cl.⁴ .......................... B60D 1/14; A01D 75/30
[52] U.S. Cl. ...................................... 280/411 C; 56/6; 56/7; 56/15.6; 56/228; 172/314; 280/412; 280/472; 280/490 R; 280/492
[58] Field of Search ................ 172/314; 56/6, 7, 13.6, 56/15.6, 10.4, 228; 280/411 R, 411 C, 411 A, 412, 442, 456 R, 472, 474, 490 R, 492

[56] References Cited

U.S. PATENT DOCUMENTS 2,569,736  10/1951  Snyder ........................... 280/412 X
4,123,082  10/1978  Conner ........................... 280/412 X

FOREIGN PATENT DOCUMENTS 696452  10/1930  France .............................. 280/490
759451  10/1956  United Kingdom ...................... 56/7

Primary Examiner—John J. Love
Assistant Examiner—Mitchell J. Hill
Attorney, Agent, or Firm—Harrington A. Lackey

[57] ABSTRACT

A lawn mower hitch assembly including a leading hitch device and a trailing hitch device secured to a respective leading mower vehicle and a trailing mower vehicle, and operatively connected to each other for free pivotal movement about a substantially vertical axis, whereby one or more lawn mower vehicles can be towed in tandem and in offset lateral relationship by a leading tractor vehicle.

4 Claims, 6 Drawing Figures

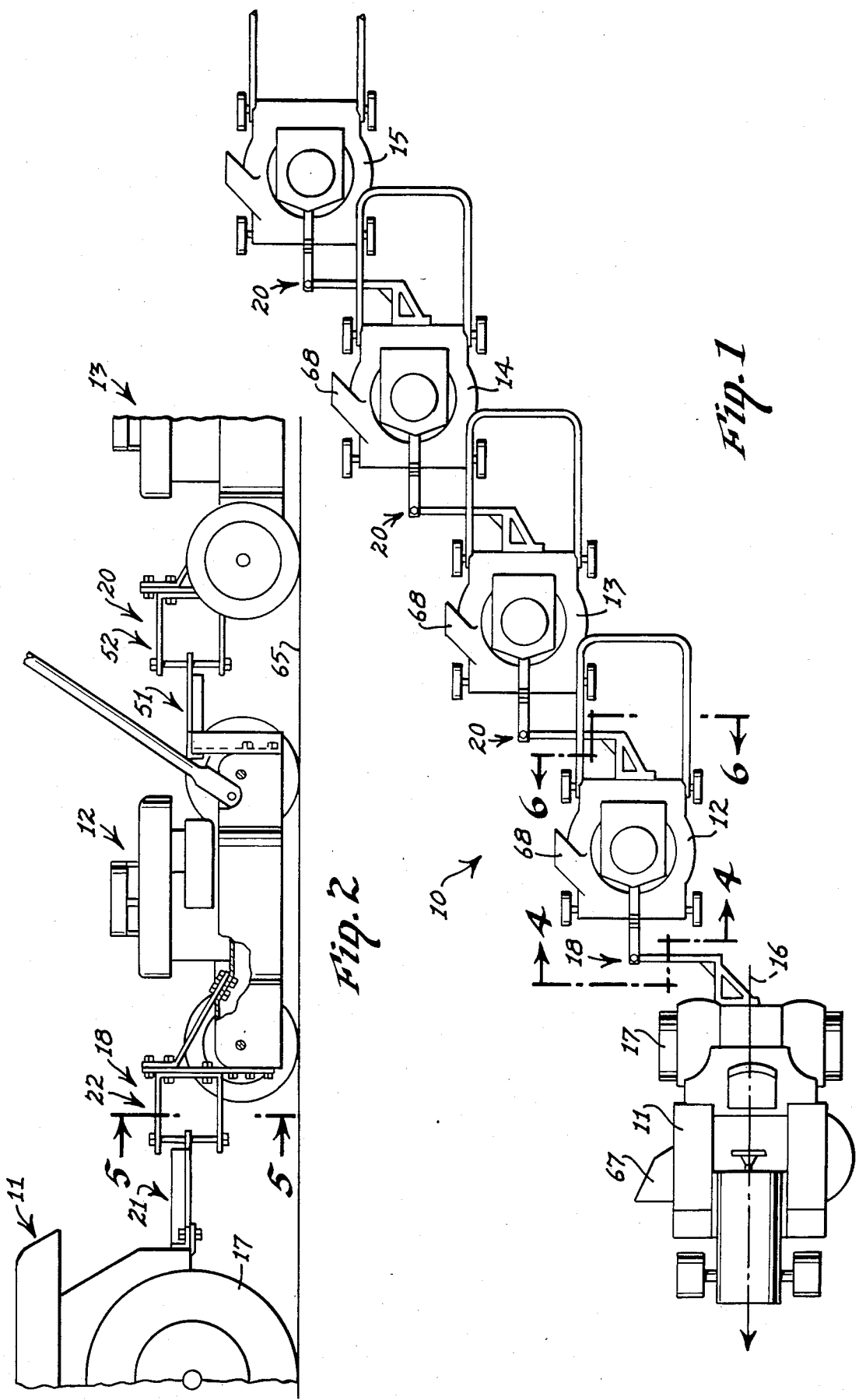

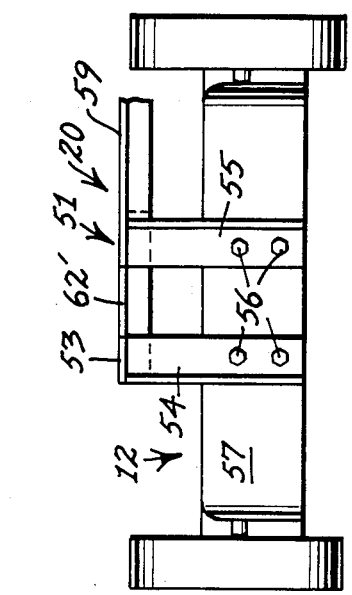
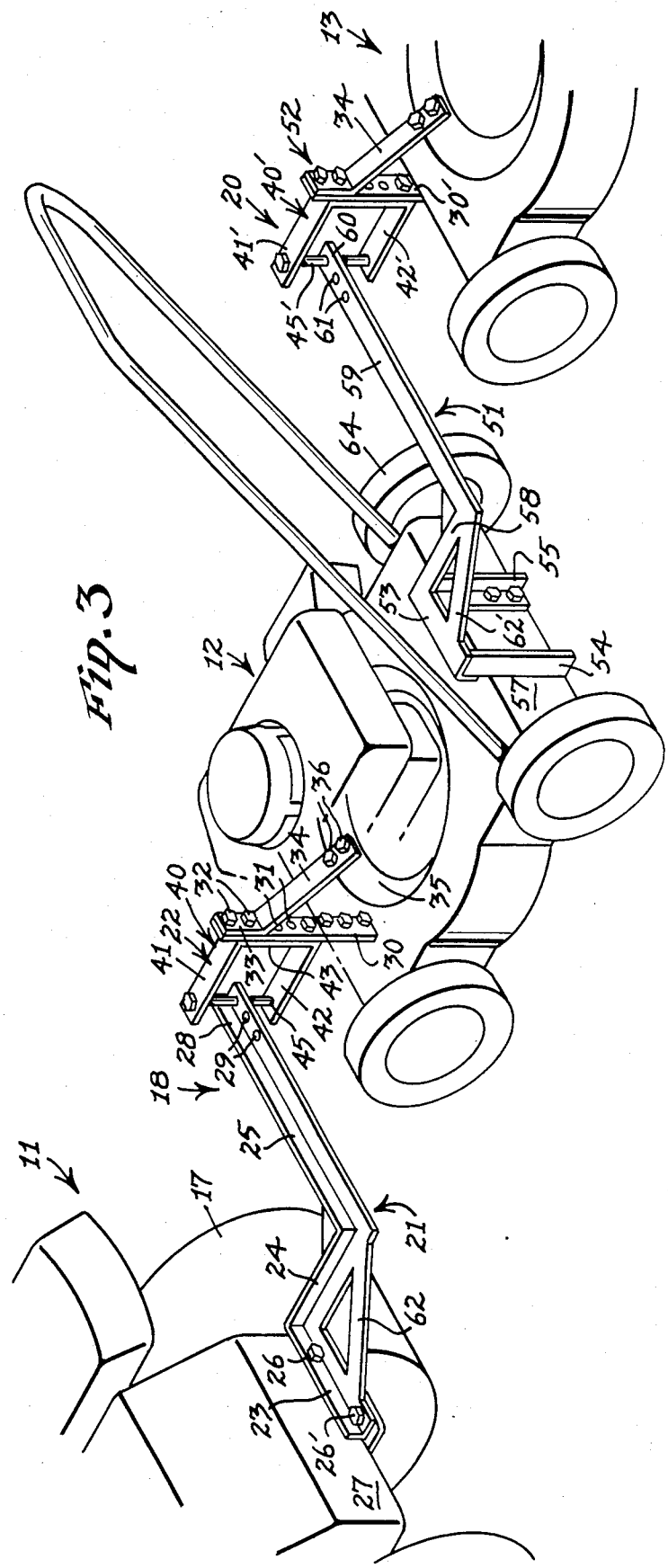

MOWER HITCH ASSEMBLY

BACKGROUND OF THE INVENTION

This invention relates to lawn mowers, and more particularly to a hitch assembly for a plurality of lawn mowers.

Hitch assemblies of various types for hitching a plurality of agricultural machines to each other, and specifically for hitching lawn mowers behind a prime mover, such as a tractor, are well known in the art, as illustrated in the following U.S. Pat. Nos.: 1,632,013, Trauger, June 14, 1927; 1,728,098, Bork, Sept. 10, 1929; 3,514,126, Fuss, May 26, 1970; 3,757,500, Averitt, Sept. 11, 1973; 3,832,834, Kovacs, Sept. 3, 1974; 4,063,748, Schmidt, Dec. 20, 1977; 4,079,960, Carson, Mar. 21, 1978.

The Trauger U.S. Pat. No. 1,632,013 and the Bork U.S. Pat. No. 1,728,093 disclose the concept of securing a plurality of towed cutting machines or mowers in tandem and offset progressively on one side of the tractor, for cutting overlapping swaths.

The Trauger U.S. Pat. No. 1,632,013 also discloses clevises 64 and 66 incorporated as elements of a complex towing hitch assembly.

The remaining of the above patents disclose various hitch arrangements for towing one or more rotary lawn mowers behind a tractor.

However, none of the above patents disclose a hitch assembly of simple construction adapted for securing one or more lawn mowers in tandem with a connection between each adjacent pair of mowers for free pivotal movement about a single vertical axis, much less a lawn mower tandem hitch assembly incorporating a draw bar and a clevis member.

SUMMARY OF THE INVENTION

It is therefore an object of this invention to provide a hitch assembly of simple construction for connecting a series of lawn mowers, one behind each other and offset progressively laterally in the same direction for towing by a single tractor.

More specifically, the hitch assembly made in accordance with this invention includes a leading hitch device adapted to be secured to the leading vehicle, whether it be the tractor, tractor mower, or a trailing lawn mower in front of a subsequent trailing lawn mower, and a trailing hitch device adapted to be secured to the front portion of any of the trailing mower vehicles. Each leading hitch device and each trailing hitch device are adapted to be connected together for free pivotal movement about a substantially vertical axis.

The particular leading hitch device includes a bracket member for securing to the rear portion of a leading vehicle, such as a tractor or a trailing mower in front of another mower, and a laterally extending draw bar having a pintle hole extending vertically through the free end portion. The trailing hitch device includes a bracket member for securing to the front portion of a trailing mower vehicle and supports a clevis member in which the upper and lower arms are disposed in a vertical plane and project forward from the bracket member. The draw bar and the trailing clevis member are journaled together by a removable pintle extending through the upper and lower arms of the clevis member and through the hole in the free end portion of the draw bar between the upper and lower arms of the clevis member.

Thus, with a hitch assembly including structurally simple leading and trailing hitch devices, any number of mowers may be connected serially in tandem behind a single tractor, with each succeeding trailing mower offset from the mower in front of it, so that the entire assembly will cut overlapping swaths of grass. The journal connection between the hitch devices permits each pair of coupled mowers to freely swing in a horizontal plane relative to each other, yet still pull the successive trailing mowers over the surface to be cut without substantially interfering with the overlapping paths of the mowers.

The trailing hitch devices are interchangeable with each other, and the leading hitch devices are also substantially interchangeable with each other, providing the cooperating hitch devices are substantially on the same level.

BRIEF DESCRIPTION OF THE DRAWINGS

FIG. 1 is a plan view of a tandem mower assembly illustrating several connected hitch assemblies in operative position;

FIG. 2 is an enlarged fragmentary side elevational view of the tractor and two trailing mowers disclosed in FIG. 1;

FIG. 3 is an enlarged top rear perspective view of the portion of the mower assembly disclosed in FIG. 2;

FIG. 4 is an enlarged front elevational view of one of the trailing mower vehicles, taken along the line 4—4 of FIG. 1;

FIG. 5 is an enlarged fragmentary sectional view taken along the line 5—5 of FIG. 2;

FIG. 6 is an enlarged rear elevational view of a trailing mower vehicle taken along the line 6—6 of FIG. 1, with the draw bar disclosed fragmentarily.

DESCRIPTION OF THE PREFERRED EMBODIMENTS

Referring now to the drawings in more detail, FIG. 1 discloses a lawn mower tandem assembly 10 including a tractor mower 11, coupled to a plurality of (four disclosed) trailer mower vehicles 12–15 of the rotary push mower type. The trailer mower vehicles 12–15 are coupled to each other and to the tractor mower 11 in tandem series, with each succeeding trailer mower being laterally offset from the preceding mower vehicles, in the same direction from the longitudinal front-to-rear axis 16, in order to permit the longitudinal swaths or paths cut by each succeeding mower to overlap each other. Thus, with one passage of the tandem assembly 10 over a length of lawn or grass, five swaths are simultaneously cut.

The trailer mower 12 is coupled to the tractor mower 11 by a hitch assembly 18 made in accordance with this invention. The trailer mowers 12, 13, 14 and 15 are sequentially coupled to each other consecutively by the hitch assemblies 20.

The hitch assembly 18 made in accordance with this invention, includes a leading hitch or hitch device 21 and a trailing hitch or hitch device 22.

The leading hitch 21 is preferably fabricated from three angle bar sections to form a bracket bar 23, an offset bar 24 and a draw bar or tow bar 25. The bracket bar 23 includes a pair of bolt holes, not shown, through which a pair of bolts 26, 26' pass to be threadedly secured to the rear end portion 27 of the tractor 11 in a substantially horizontal transverse position, as best disclosed in FIG. 3. The offset bar 24 extends longitudinally of the tractor 11 and at right angles to the bracket bar 23. The offset bar 24 extends rearwardly far enough to project behind the wheels 17 and chassis of the tractor 11. The draw bar 25, is integrally fixed at its inner end to the rear end of the offset bar 24 so that the draw bar 25 extends substantially horizontally and laterally beyond the chassis and wheels 17 of the tractor 11, which is beyond the right side of the tractor 11, as disclosed in the drawings. The draw bar 25, terminates in a free end portion 28 including a plurality of transversely spaced, vertical pintle holes 29 (FIG. 3).

The trailing hitch device 22 preferably includes a vertical bracket or securing bar 30 having a plurality of vertically spaced bolt holes 31. Secured to the rear surface of the upper end portion of the bracket bar 30 by bolts 32, is the upper flange portion 33 of the rearward declining brace bar 34. The lower rear end portion of the brace bar 34 is secured to a declining surface portion 35 of the housing of the mower 12 by bolts 36.

The lower end portion of the bracket or support bar 30 is secured to the forward flange portion 37 of the housing of the mower 12, by means of bolts 38.

Fixed to the front surface of the bracket bar 30 by bolts 39, is a clevis member 40 including an upper arm 41 and a lower arm 42 joined by a bight member 43. The bight member 43 is provided with holes 44 through which the bolts 39 project to fix the clevis member 40 on the front surface of the bracket bar 30. In this fixed position, upper and lower arms 41 and 42 are vertically spaced parallel to each other to project forward and terminate in free end portions, each of which is provided with vertically aligned pintle holes, not shown, for receiving the removably insertable vertically extending pintle or pivot rod 45.

The pintle 45 has a head 46 at its upper end and is long enough to extend downwardly through the vertically registering holes in the upper arm 41 and the lower arm 42, as well as through one of the pintle holes 29 is registry with the pintle 45 when the draw bar 25 extends between the upper arm 41 and the lower arm 42, as illustrated in FIG. 3. The several pintle holes 29 in the draw bar 25 permit lateral adjustment of the trailing mower 12 relative to the tractor mower 11, so that the cutting swaths of the respective tractor mower 11 and trailing mower 12 may be appropriately spaced or overlapped. The lower portion of the pintle 45 is externally threaded to preferably receive a nut 47 in order to secure the pintle 45 in position to pivotally connect the draw bar 25 to the clevis member 40.

The relative vertical locations of the bracket bar 23 on the tractor 11 and the bracket bar 30 on the trailer mower 12 are such that the draw bar 25 will extend laterally and horizontally between the upper arm 41 and the lower arm 42 to permit the pivotal connection with the pintle 45.

The hitch assembly 20 for coupling the trailer mower 12 and the trailer mower 13 is substantially of the same construction as the hitch assembly 18.

The hitch assembly 20 includes a leading hitch device 51 pivotally coupled to a trailing hitch device 52. Since the trailing hitch device 52 is identical in construction to the trailing hitch device 22, the corresponding parts of the trailing hitch device 52 will bear the same reference numerals, primed, as the corresponding elements in the trailing hitch device 22, as best illustrated in FIG. 3.

The leading hitch device 51 includes a bracket member having a top cross bar 53, preferably an angle bar, integrally secured, such as by welding, to a pair of depending support bars 54 and 55. The support bars 54 and 55 are provided with vertically spaced bolt holes, not shown, appropriately located or spaced so that when bolts 56 extend through these bolt holes, the support bars 54 and 55 will be securely fastened to the rear flange 57 of the trailer mower 12, as illustrated in FIGS. 3 and 6, to place the top cross bar 53 in the desired elevational location. The right end portion of the top cross bar 53 of the bracket member is integrally joined to a rearwardly projecting offset bar 58, the rear end of which is integrally joined to the transverse laterally extending draw bar 59. The free end portion 60 of the draw bar 59 is also provided with pintle holes 61 spaced longitudinally of the draw bar 59, for reception of the pintle 45' when the free end portion 60 is located between the upper arm 41' and the lower arm 42' of the clevis member 40' of the trailing hitch device 52, as best disclosed in FIG. 3. Each draw bar 59 is also long enough to project laterally outboard of the rear wheel 64 of each corresponding leading trailer mower to provide an offset coupling with the corresponding clevis member 40'.

Thus, the difference in construction of the bracket member 53, 54 and 55 of the leading hitch device 51, and the bracket bar 23 of the leading hitch device 21, is to properly locate the respective draw bars 59 and 25 so that they extend between the upper and lower arms 41 and 42 of the respective clevis member 40' and 40.

In a preferred form of the invention, diagonal brace bars 62 and 62' are integrally joined across the respective transverse bracket bars 23 and 53 and their corresponding offset bars 24 and 58 for additional rigidity and strength.

The pintle holes 29 and 61 may be oversized to permit a loose coupling between the respective draw bars 25 and 59 and their corresponding clevis member 40 and 40'. The vertical spacing between the upper and lower arms 41 and 42 of the respective free end portions of the clevis members 40 and 40 is substantially greater than the vertical dimension of the respective draw bars 25 and 59, as disclosed in FIGS. 3 and 4, so that each mower 11 and 12 may have a limited amount of vertical independent motion as mowers 12–15 move over an uneven ground surface 65.

In a preferred form of the invention, as best disclosed in FIG. 1, the successively trailing mowers 12–15 are offset to the right of the preceding mower so that the discharge of cut grass from the discharge spouts 67 and 68 of the respective tractor 11 and trailing mowers 12–15, will lie in the path of the next trailing mower for further disintegration.

It will be observed that all of the trailing hitch devices 22 and 52 are interchangeable, as well as the leading hitch devices 51.

It will also be understood that the bracket bars 30 and brace bars 34 may be bent or re-positioned as desired in order to fit varying contours in the housings of different types of rotary lawn mowers.

What is claimed is:

1. In a lawn mower towing assembly including a leading vehicle and a trailing vehicle, each vehicle having a longitudinal front-to-rear axis, a hitch assembly comprising:

(a) a leading hitch device comprising leading bracket means for connection to the rear portion of a leading vehicle, and an elongated draw bar extending transversely from said bracket means, laterally of the longitudinal axis of the leading vehicle, and terminating in a free end portion,
(b) means securing said leading bracket means to the rear portion of the leading vehicle,
(c) a trailing hitch device comprising a trailing bracket bar for connection to the front portion of a trailing vehicle, and a single clevis member,
(d) means securing said trailing bracket bar to the front portion of the trailing vehicle in operative position,
(e) said single clevis member comprising vertically spaced upper and lower arms and a bight member connecting said upper and lower arms,
(f) means securing said bight member to said trailing bracket bar so that said upper and lower arms project forwardly in a substantially vertical plane,
(g) said draw bar having a vertical journal hole extending through its free end portion,
(h) said upper and lower arms terminating in free end portions including vertically aligned holes,
(i) a pintle removably inserted substantially vertically through the holes in said upper and lower arms and said vertical journal hole when said free end portion is between said upper and lower arms and said vertical journal hole is in registry with said pintle, in operative position,
(j) said journal hole being large enough to permit free pivotal movement of said draw bar about the vertical axis of said pintle,
(k) said free end portion of said draw bar having a vertical dimension, the vertical spacing between said upper and lower arms being substantially greater than the vertical dimension of said free end portion of said draw bar to permit a limited amount of vertical independent motion between the leading and trailing vehicles connected by said hitch assembly.

2. The invention according to claim 1 in which said leading bracket means comprises a leading bracket bar for connection to the rear portion of the leading vehicle and a rearward projecting offset bar fixed to said leading bracket bar and to said draw bar, whereby said draw bar extends laterally behind the chassis and wheels of the leading vehicle.

3. The invention according to claim 1 in which said trailing bracket bar is vertical, and said means securing said bight member to said trailing bracket bar securing said bight member and said trailing bracket bar together in vertical alignment.

4. The invention according to claim 3 in which said trailing hitch device further comprises a trailing brace bar having first and second end portions, said first end portion being connected to the upper end portion of said trailing bracket bar so that said trailing brace bar declines rearwardly, and means securing said second end of said trailing brace bar to the trailing vehicle in a location spaced behind said trailing bracket bar.

* * * * *